July 4, 1961 R. T. SHEEHAN 2,990,938
SELF-PROPELLED ARTICULATED STACKING CONVEYOR
Filed Dec. 3, 1956 4 Sheets-Sheet 1
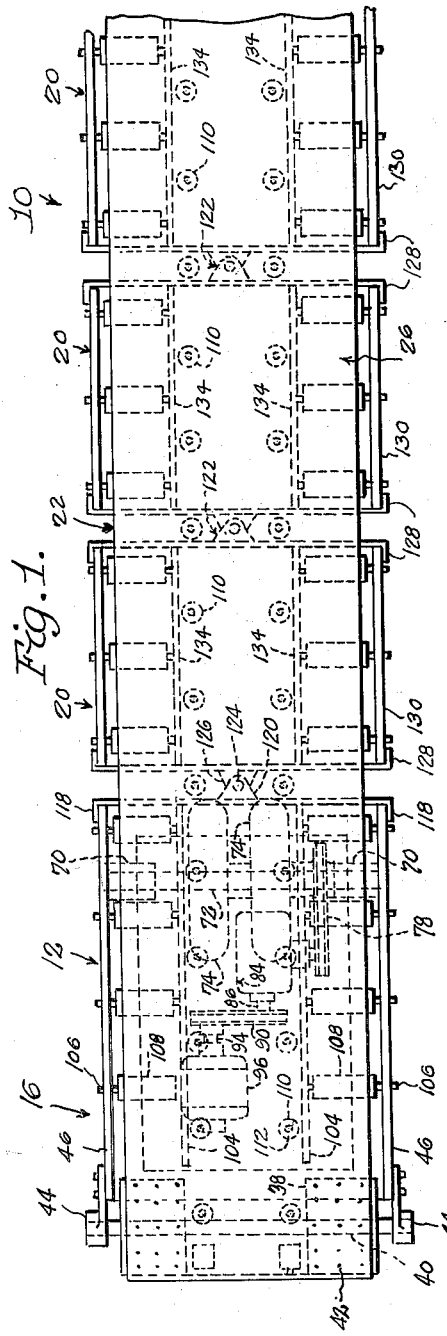
INVENTOR.
Robert T. Sheehan
BY Barthel & Bugbee
Attys

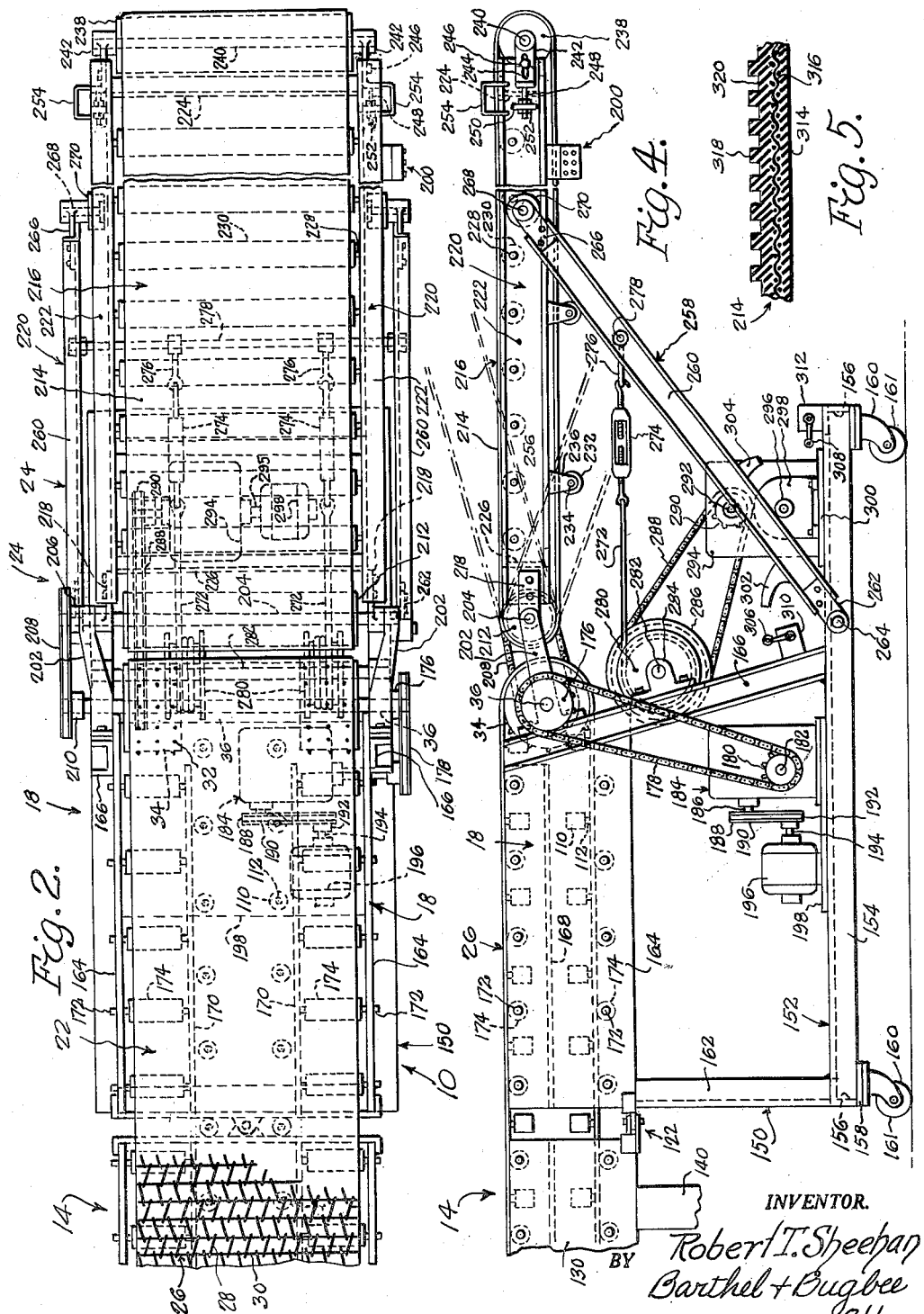

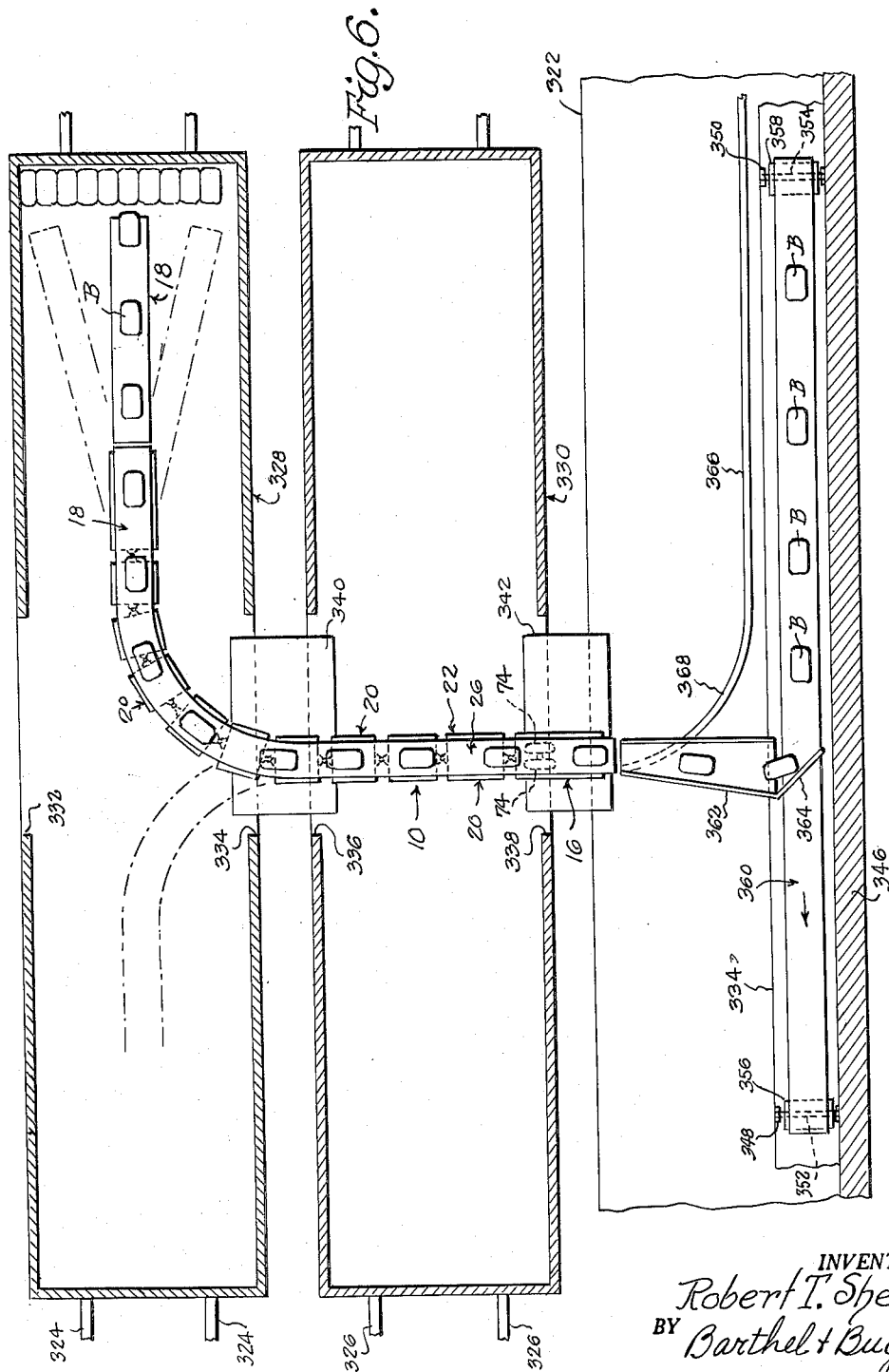

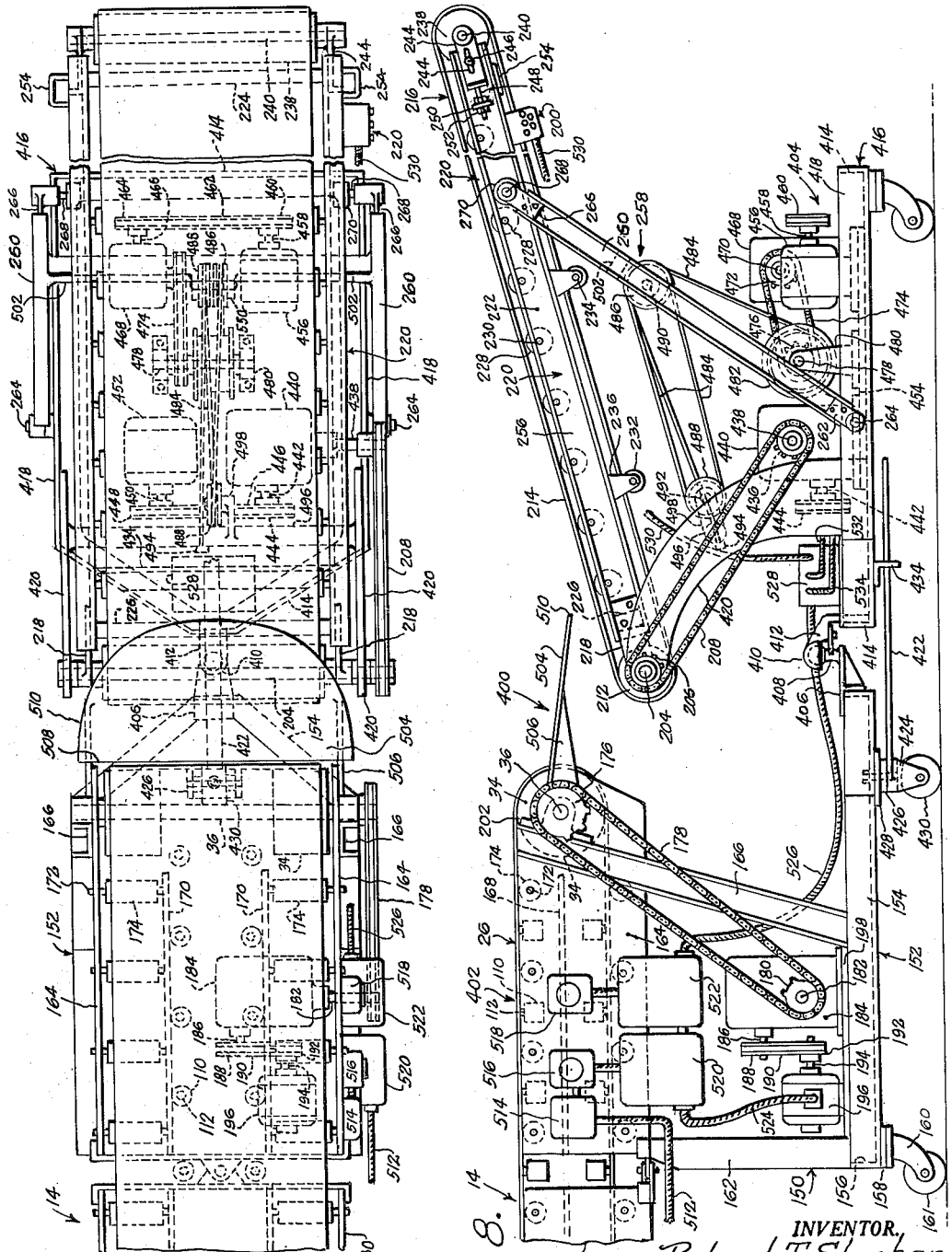

United States Patent Office 2,990,938
Patented July 4, 1961

2,990,938
SELF-PROPELLED ARTICULATED STACKING CONVEYOR
Robert T. Sheehan, 31530 Myrna Road, Livonia, Mich.
Filed Dec. 3, 1956, Ser. No. 625,799
5 Claims. (Cl. 198—90)

This invention relates to conveyors and, in particular, to stacking conveyors.

One object of this invention is to provide a stacking conveyor which carries articles to be stacked to the location where they are to be stacked and at that location deposits them in successive layers to form the required stack, the stacking operation being capable of accurate control and placement by an operator.

Another object is to provide a stacking conveyor of the foregoing character which includes multiple articulated portions and a flexible belt passing thereover in such a manner as to enable the articles to be stacked to be loaded at the location which is out of line with the location where the stacking is to take place, thereby enabling the conveyor to enter the side door of a freight car and stack the articles at either or both ends of the freight car.

Another object is to provide a stacking conveyor of the foregoing character wherein the conveyor is self-propelled, so that it can be moved bodily forward or backward as stacking proceeds, as well as moved into or out of the stacking location, such as a freight car, truck, trailer or the like.

Another object is to provide a self-propelled stacking conveyor, as set forth in the object immediately preceding, wherein the self-propelling mechanism is remotely controlled by an operator, preferably at the stacking location, so that the conveyor may be moved forward or backward as stacking proceeds, without requiring the operator to leave his station.

Another object is to provide a stacking conveyor of the foregoing character wherein the conveyor terminates in an independently movable stacking belt conveyor which can be inclined upward or downward to vary the level at which the conveyed articles are stacked, as well as having the capability of being moved sidewise to and fro in order to deposite the articles laterally in one layer before stacking the next layer.

Another object is to provide a modified self-propelled stacking conveyor of the foregoing character wherein the forward end of the conveyor is provided with an independently swingable car having a stacking belt conveyor which can be inclined upward or downward to vary the level at which the conveyed articles are stacked and which can be likewise moved sidewise to and fro to deposit the articles laterally at any desired location.

Other objects and advantages of the invention will become apparent during the course of the following description of the accompanying drawings, wherein:

FIGURE 1 is a top plan view of the rearward portion of a self-propelled articulated stacking conveyor, according to one form of the invention;

FIGURE 2 is a top plan view of the forward portion of the conveyor shown in FIGURE 1;

FIGURE 3 is a side elevation of the rearward portion of the conveyor shown in FIGURE 1;

FIGURE 4 is a side elevation of the forward portion of the conveyor shown in FIGURE 2;

FIGURE 5 is a detailed enlarged longitudinal section through a portion of the stacking conveyor belt shown in FIGURES 2 and 4;

FIGURE 6 is a diagrammatic view, partly in top plan view and partly in horizontal section through a pair of freight cars disposed side by side and being loaded with bags of material stacked by the self-propelled articulated stacking conveyor of the present invention;

FIGURE 7 is a top plan view of the forward portion of a modified self-propelled articulated stacking conveyor according to another form of the invention; and FIGURE 8 is a side elevation of the portion of the conveyor shown in FIGURE 7.

Referring to the drawings in detail, FIGURES 1 to 4 inclusive show a self-propelled articulated stacking conveyor, generally designated 10, as consisting generally of a rearward propelling portion 12 (FIGURES 1 and 3) and a forward stacking portion 14 (FIGURES 2 and 4). It will be understood that FIGURES 1 and 2 are to be considered as a whole, the latter being an extension of the former in top plan view, and for the same reason FIGURES 3 and 4 are likewise to be considered as a whole, with the latter an extension of the former.

The conveyor installation 10 consists generally of a propelling unit, generally designated 16, located at the rearward end of the conveyor installation, a stacking unit 18 located at the forward end thereof, and multiple intermediate units 20 articulated to and between the propelling unit 16 and the stacking unit 18. The conveyor installation 10, regarded from another viewpoint, consists generally of a transporting conveyor assembly 22 which extends from the rearward end of the propelling unit 16 to approximately the mid-portion of the stacking unit 18, and a stacking conveyor assembly 24 which occupies and extends forwardly from approximately the mid-portion of the stacking unit 18. The transporting conveyor assembly 22 thus receives the articles to be stacked, at a loading station preferably located above the propelling unit 16, transports them to a transfer station located approximately at the mid-portion of the stacking unit 18 (FIGURES 2 and 4) and there transfers them to the stacking conveyor assembly 24 which conveys them to a discharge station at the forward end thereof from which they fall onto the location at which they are to be stacked.

The transporting conveyor assembly 22, together with the intermediate units 20, the rearward unit 16 excluding the self-propelling mechanism, and the rearward portion of the forward unit 18 excluding the stacking assembly 24 are disclosed and claimed in my co-pending application Serial No. 495,650 filed March 21, 1955, now Patent No. 2,859,861 for Articulated Belt Conveyor, of which the present invention is an improvement.

The transporting conveyor assembly 22 includes a flexible loosely-woven endless wire mesh belt 26 consisting of laterally-elongated open-mesh links 28 (FIGURE 2) pivotally interconnected by elongated undulating pivot rods 30, as explained more in detail in my above-mentioned Patent No. 2,859,861. The links 28 are constructed of wire woven into the approximate shape of a flattened helical spring, and the pivot rods 30 are of undulating shape so as to provide notches alternately directed in opposite directions for receiving the rounded end portions of the links 28. Since the adjacent curved portions of each link 28 loosely and movably engage the pivot rod 30 of the next adjacent link 28, the adjacent pivot rods 30 are thereby enabled to move out of parallelism relatively to one another within the spaces in the interior of the links 28 so as to cause the ends of the pivot rods 30 to closely approach one another on one edge of the belt 26 while remaining widely separated from one another on the opposite edge of the belt when the belt is caused to execute a curve or bend in its own plane.

Since the links 28 of the transporting conveyor belt 26 are thus of open-mesh construction, they are driven by pins 32 (FIGURE 2) on a forward conveyor-supporting-and-driving wheel consisting of driving drums 34 placed side by side in axially-spaced relationship on a common drive shaft 36, thereby driving and supporting the forward end of the transporting conveyor belt 26, the rearward end of which is supported upon a rearward conveyor-supporting wheel consisting of similarly-arranged idler drums 38 placed side by side in axially-spaced relationship upon an idler shaft 40 (FIGURES 1 and 3) and provided with pins 42 similar to the pins 32 of the drums 34 and similarly entering the spaces in the open-meshed links 28. The idler shaft 40 is rotatably supported upon bearing brackets 44 which in turn are bolted or otherwise secured to the upper side plates 46 of the frame 48 of the propelling unit 16. The upper side walls 46 are in the form of elongated metal plates which are welded or otherwise secured to upright angle members 50, the lower ends of which are welded to longitudinal angle members 52. The angle members 50 are interconnected by transverse end members 54 and corner plates 56 are welded to the rearward corners of the frame 48 to support the base plates 58 (FIGURE 3) of swivelling caster wheels, generally designated 60, each having a yoke-shaped bracket 62 swivelled as at 64 to the base plate 58 and carrying an axle 66 upon which a wheel 68 is rotatably mounted.

Secured to the under sides of the longitudinal frame members 52 near their forward ends are laterally-spaced coaxial bearing blocks or journal bearings 70 (FIGURE 3) in which a driving axle 72 is rotatably mounted. Drivingly mounted side by side on the axle 72 in a close-together relationship are two propelling wheels 74. Also drivingly mounted on the driving axle 72 is a drive sprocket 76 driven by a sprocket chain 78 which in turn is driven by a sprocket 80 on the output shaft of a conventional speed reduction gear box 84, the input shaft 86 of which carries a pulley 88 driven by a belt 90 from a motor pulley 92 on the motor shaft 94 of an electric motor 96. The latter and the reduction gear box 74 are bolted or otherwise secured to the under side of a supporting plate 98 which in turn is secured to the lower edges of the side plates 46 adjacent intermediate longitudinal frame members 100 mounted at the upper ends of the upright angle members 50. As described in more detail below, the energization of the motor 96, which is a reversible electric motor, is controlled remotely from a station located at the forward end of the conveyor installation 10.

In order to support and guide the transporting conveyor belt 26, the propelling unit 16 is provided with a shelf 102 (FIGURE 3) interconnecting the side plates 46 and in turn supporting parallel upstanding and depending bars 104. The bars 104 and the side plates 46 are alignedly drilled to receive roller axles 106 which carry intermediate conveyor-supporting wheels consisting of supporting rollers 108 and which also serve as tracks for engagement by guide rollers 110 mounted on vertical axles 112 secured to the inner side of the transporting conveyor belt 26 in a manner more fully set forth in detail in my above-mentioned Patent No. 2,859,861. In order to provide for convenient twisting or turning of the conveyor installation 10, the transporting conveyor belt is made of excessive length with a slack portion 114 adapted to be accommodated in the space below the shelf 102 in the propelling unit 16 (FIGURE 3) and resting upon inclined supporting tracks 116 secured to the frame 48.

The side plates 46 are interconnected near their lower forward corners by tie members 118, the central portions of which carry coupling tongues 120 of coupling devices, generally designated 122. The tongues 120 are drilled vertically to receive a coupling pin 124 which in turn passes through a coupling tongue 126 secured to a similar tie member 128 at the rearward corners of the side plates 130 of the adjacent intermediate unit 20. The latter is similarly provided with a shelf 132 similar to the shelf 102 of the propelling unit 16 and similarly carrying upstanding and depending bars 134 similarly bored to receive axles 136 of supporting rollers 138 for the transporting conveyor belt 26, as well as guiding the guide rollers 110 thereof in the manner described above.

Each of the intermediate units 20 is provided with spaced parallel upright channel legs 140, the upper ends of which are welded or otherwise secured to the inner surfaces of the side plates 130. The lower ends of the legs 140 are provided with lower cross members 142 interconnecting their lower ends and in turn supporting yoke-shaped brackets 144 drilled to receive axles 146 upon which ground wheels 148 are rotatably mounted. The adjacent intermediate units 20 are interconnected by coupling devices 122 of the same type as those just described, as are also the foremost intermediate unit 20 and the stacking unit 18.

The stacking unit 18 is provided with a frame, generally designated 150 (FIGURES 2 and 4) including a rectangular base subframe 152 composed of longitudinal angle members 154 interconnected at their opposite ends by angle cross members 156 and serving at their corners to support the base plates 158 of swivelling caster wheels 160 similar to the swivelling caster wheels 60 described above and having ground wheels 161. Rising from the rearward end of the base subframe 152 are upright angle frame members 162, the upper ends of which are welded or otherwise secured to the inner surfaces of elongated rectangular side plates 164 in the manner previously described in connection with the uprights 50 and side plates 46 of the propelling unit 16. The forward edges of the side plates 164 are inclined and have welded or otherwise secured to them inclined parallel channel frame members 166 which, in cooperation with the frame members previously described, constitute the stacking unit frame 150. Secured to and extending between the side plates 164 is a shelf 168 with upstanding and depending spaced bars 170 of construction similar to that previously described in connection with the shelf 102 and bars 104. The side plates 164 and bars 170 are drilled, as before, to receive axles 172 upon which intermediate conveyor-supporting wheels consisting of supporting rollers 174 are rotatably mounted for supporting the transporting conveyor belt 26, the bars 170 also providing lateral guidance for the vertical guide rollers 110.

The transporting conveyor belt 26 as previously stated is driven by the spiked drums 34 mounted on the driving shaft 36 (FIGURE 4). This is accomplished by a sprocket 176 keyed or otherwise drivingly connected to the shaft 36 and driven by a sprocket chain 178 from a sprocket 180 mounted on the output shaft 182 of a conventional speed reduction gear box 184 similar to the speed reduction gear box 84 and similarly provided with an input shaft 186 carrying a pulley 188 driven by a belt 190 from a motor pulley 192 mounted on the motor shaft 194 of an electric motor 196. The motor 196 and speed reduction gear box 184 are secured to and mounted upon a base plate 198, which in turn is secured to the subframe 152. The actuation of the motor 196 is controlled from a push button control station, generally designated 200, located at the forward end of the conveyor installation 10 and described in more detail below. The same control station 200 also controls the actuation of the reversible motor 96 of the propelling unit 16, as also described below.

The drive shaft 36 is rotatably supported in a pair of laterally-spaced parallel double bearing brackets 202 (FIGURE 4) bolted or otherwise secured to the upwardly-inclined channel frame members 166 near their upper ends. The same bearing brackets 202 near their outer ends rotatably support a combined pivot and drive shaft 204. Drivingly secured to the outer end of the shaft 204 is a sprocket 206 driven by a sprocket chain 208 from a sprocket 210 drivingly mounted on the corresponding outer end of the drive shaft 36. Keyed or otherwise drivingly secured to and mounted on the shaft 204 is a conveyor supporting and driving drum 212 (FIGURES 2 and 4) which drives and supports the rearward end of a stacking conveyor belt 214 forming the conveying portion of a stacking conveying sub-assembly, generally designated 216, at the forward end of the stacking conveyor assembly 24.

Also swingably mounted for pivoting upon the shaft 204 are two supporting arms 218 of a stacking conveyor boom structure, generally designated 220, to which the arms 218 are bolted or otherwise secured (FIGURE 4). The boom structure 220 includes a pair of laterally-spaced outwardly-facing parallel channel members 222 to which the arms 218 are secured, these being interconnected near their opposite ends by forward and rearward cross members 224 and 226 respectively (FIGURE 2). The channel members 222 near their upper flanges are drilled to receive the axles 228 of longitudinally-spaced supporting rollers 230 for the upper course of the stacking conveyor belt 214. The lower course of the conveyor belt 214 is supported by rollers 232, the axles 234 of which are rotatably mounted in bearing brackets 236 secured to and depending from the lower flanges of the channel members 222. The forward end of the conveyor belt 214 is supported upon an idler drum 238 carried by a shaft 240 mounted in bearing brackets 242. The latter are slotted as at 244 for the passage of guide pins or bolts 246 in relation to which the brackets 242 are adjustable forward and backward by means of screw shafts 248 secured to their rearward ends and passing through fixed brackets 250 to which they are adjustably secured by nuts 252 threaded upon the screw shaft 248. This arrangement permits the slack of the stacking conveyor belt 214 to be taken up or adjusted, as desired. Handles 254 secured to the channel members 222 near their forward ends enable an operator to swing the stacking unit 18 laterally by swinging the boom structure 220 from side to side.

The channel troughs 256 formed by the outwardly-facing channel members 222 between the upper and lower flanges thereof serve as channel guide tracks for conveyor boom raising and lowering mechanism, generally designated 258. For this purpose, laterally-spaced parallel operating channel arms 260 are bolted or otherwise secured at their lower ends to lower bearing brackets 262 pivotally mounted on a pivot shaft 264 which in turn is mounted in the spaced parallel frame members 154 of the sub-frame 152. Bolted or otherwise secured to the upper ends of the channel arms 260 are upper bearing brackets 266 which rotatably support the axles 268 of rollers 270 substantially filling the space between the flanges of the channel members 222 and traveling back and forth in the channel guideway 256 thereof.

The arms 258 are lowered or swung downward by gravity in response to the weight of the boom structure 220, conveyor belt 214 and the associated mechanism of the stacking conveyor sub-assembly 216, and raised by laterally-spaced parallel cables or other flexible hoisting members 272, the forward ends of which are connected to turnbuckles 274 which in turn are connected at their forward ends to eyes 276 pivoted as at 278 to the channel arms 260 near their upper ends. The cables 270 are secured at their rearward ends to laterally-spaced co-axial winding drums 280 (FIGURE 4) upon which they are wound and unwound in order to raise or lower the channel arms 258 and consequently to raise or lower the stacking conveyor subassembly 216. The cable drums 280 are keyed or otherwise drivingly secured to a cross shaft 282 journaled in bearing blocks 284 which in turn are bolted or otherwise secured to the inclined channel frame members 166. Also drivingly secured to the cross shaft 282 is a sprocket 286 meshing with a sprocket chain 288 which is driven by a sprocket 290 mounted upon the output shaft 292 of a conventional speed reduction gear box 294, the input shaft 295 (FIGURE 2) of which is coaxial with and coupled to the output shaft 296 of an electric raising and lowering motor 298 mounted upon a sub-base 300. The latter is secured to the sub-frame 152 and likewise supports the speed reduction gear box 294.

The raising and lowering motor 298 is reversible and controlled from the same push button control switch stations 200 as the motors 96 and 196 previously described. The upward and downward swinging of the arms 258 is kept within prescribed limits by upper and lower cams 302 and 304 respectively engageable with the operating arms 306 and 308 of upper and lower limit switches 310 and 312 respectively (FIGURE 4), these limit switches 310 and 312 being in series with the control switch at the control station 200. The stacking conveyor belt 214 (FIGURE 5) is preferably of a cord or fabric-reinforced rubber or synthetic rubber construction. For this purpose, the belt 214 is provided with an endless body portion 314 reinforced by a textile layer 316 of fabric or cord construction and having longitudinally-spaced transverse ribs 318 on the outer surface 320 thereof to inhibit backward slippage of the articles conveyed on the stacking conveyor belt 214. The forward end of the transporting conveyor belt 26 and the rearward end of the stacking conveyor belt 214 are placed closely adjacent one another so that the conveyed and stacked articles, such as bags of grain, bales of material or the like will not fall through the space between them (FIGURE 2).

The operation of the self-propelled articulated stacking conveyor 10 is shown diagrammatically for one type of situation in FIGURE 6. Here there is shown a loading dock 322 extending beside and parallel to pairs of railway tracks 324 and 326 upon which outer and inner freight cars 328 and 330 are temporarily placed, with their side doors 332, 334, 336 and 338 in line with one another, with ramps or plates 340 and 342 respectively connecting the side door 334 to the side door 336, and the side door 338 to the loading dock 322. The loading dock 322 is provided with a shelf or ledge 344 raised above it, such as by being mounted on the back wall 346, and this in turn supports bearing pedestals 348 and 350 spaced longitudinally away from one another along the loading dock 322. Rotatably supported in the bearing pedestals 348 and 350 are the shafts 352 and 354 of belt conveyor supporting drums 356 and 358, one of which is driven by mechanism (not shown) in the direction of the arrow (FIGURE 6) so as to support and drive an endless belt 360 for conveying bags or other articles B from a loading station (not shown) in the vicinity of the conveyor drum 358 to the upper end of a downwardly-inclined chute 362. The conveyed articles B to be stacked are intercepted by a deflector 364 extending obliquely across the conveyor belt 360 at the mouth of the chute 362. In order to simplify the disclosure, the supporting structure for the chute 362 and deflector 364 has been omitted.

The loading dock 322 is also provided with one or more guide rails 366, preferably of upwardly-facing channel construction for receiving and guiding the ground wheels 68, 148 and 161 respectively. As the conveyor installation 10 travels along the loading dock 322 to the ramp 342 and through the freight car doors 338 and 336, across the ramp 340 and through the freight car door 334 into the interior of the outer freight car 328, as described more fully below in connection with the operation of the invention. The channel guide rail 366 is provided with a bend or arcuately-curved portion 368 to change the direction of travel of the conveyor installation 10 from a direction lengthwise of the loading dock 322 to a direction perpendicular thereto in order for it to cross the ramp 342 and enter the inner freight car door 338. As is evident from FIGURE 6, the propelling wheels 74 of the propelling unit 16, being placed close to one another side by side inboard of the ground wheels 68, do not collide with or otherwise conflict with the guide rail 366.

In the operation of the invention (FIGURE 6), let it be assumed that the conveyor installation 10 is resting on the loading dock 322 parallel to the longitudinal edge thereof and that bags B of material, such as grain, rice and so forth are to be loaded into the freight cars 328 and 330 in stacked tiers. The operator engages one of the ground wheels 68 of the propelling unit 16 with the guide rail 366 and, by operating the appropriate switch in the control station 200, starts the propelling motor 96 in rotation in a forward direction, rotating the propelling wheels 74 and causing the conveyor installation 10 to move along the loading dock 322 toward the loading chute 362. The operator walks alongside the stacking unit 18, guiding it by grasping one of the handles 254 and steering it by moving it sidewise in the desired direction along the desired path of travel. In so doing, he guides the propelling unit 18 across the ramp 342 through the freight car 330 and across the ramp 340 into the freight car 328 to one end thereof, as shown in FIGURE 6. Meanwhile, the guidance imparted by the arcuate portion 368 of the guide rail 366 has moved the propelling unit 16 or one of the intermediate units 20, as the case may be, beneath the outlet of the chute 362, whereupon the conveyor installation 10 is ready for operation.

In the meantime, bags B of the material to be conveyed and stacked have been deposited upon the supply conveyor belt 360 and carried in the direction of the arrow to the deflector 364 which deflects them onto the downwardly-inclined chute 362. The bags slide down the chute 362 onto the transporting conveyor belt 26 which the operator has meanwhile set in motion by operating another of the switches at the control station 200. The bags travel along the belt 26 and make the turn with it in the outer freight car 328, the lateral turn being made possible through the loose wire mesh link construction thereof shown at the left-hand end of FIGURE 2. The setting in motion of the transporting conveyor belt 26 also sets in motion the stacking conveyor belt 214 through the interconnection thereof by the sprocket chain 208.

In order to discharge the bags B from the stacking conveyor belt 214 onto the floor of the freight car 328, the operator operates the appropriate switch at the control station 200 to cause the motor 298 (FIGURE 4) to rotate the sprocket 286, drum shaft 282 and drums 280 in a boom-lowering direction so as to pay out the cables 272, whereupon the weight of the stacking conveyor boom structure 220 causes it to swing downward as the rollers 270 on the upper ends of the operating arms 260 travel along the channel members 22, likewise permitting the arms 260 to swing downward around their pivot shaft 264. When the front end of the stacking conveyor boom assembly 220 has been lowered to the desired extent, the operator halts the motor 298 by operating the appropriate switch of the control station 200.

As the bags B arrive at the forward end of the transporting conveyor belt 26, they drop into the gap between it and the stacking conveyor belt 214, their engagement with the ribs 318 of the latter causing them to be picked up and carried along the upper course of the stacking conveyor belt 214 to the forward end thereof. When the bags B reach the forward end of the conveyor belt 214, they drop off it as the belt 214 rounds the drum 238, the bags dropping downward onto the floor of the freight car 328. As the bags B drop one by one, the operator swings the stacking unit 18 sidewise by means of one of the handles 254, as indicated by the dotted lines in the upper right-hand corner of FIGURE 6, causing the bags to be deposited side-by-side in the bottom layer of the first tier.

As the bags B continue to arrive, the operator energizes the motor 294 by operating the appropriate switch at the control station 200 to rotate the cable drums 280 in a direction hauling in the cables 272, consequently swinging the arms 260 upward and thereby swinging the channel members 222 of the stacking conveyor boom structure 220 upward to the level of the layer immediately above the first layer of bags. The operator then repeats the foregoing operation, depositing the bags upon the first layer thereof to form a second layer, swinging the stacking conveyor unit 18 sidewise by the handles 254 in the reverse direction, repeating the foregoing operations until the bags have been stacked the desired height within the freight car 328.

The operator now operates the appropriate switch in the control station 200 to cause the propelling motor 96 to rotate in a reverse direction, moving the propelling unit 16 rearwardly and causing the entire stacking conveyor installation 10 to move rearwardly, backing the forward end of the stacking conveyor unit 18 to the position shown in FIGURE 6, ready to begin stacking the bottom layer of the second tier. The operation is then repeated to pile the bags in the second stack, layer by layer, swinging the stacking unit 18 from side to side in the foregoing manner and raising the boom structure 220 layer by layer as the stacking proceeds. In this manner, the operator fills one end of the car 328 with the bags, then reverses the direction of travel of the stacking conveyor installation 10 into the dotted line position in the upper left-hand corner of FIGURE 6, so as to stack the bags in the foregoing manner in the left-hand end of the freight car 328. Having filled the left-hand end of the freight car 328 with layers of bags in multiple stacks, he then operates the propelling motor 96 in a reverse direction to back the propelling unit 16, thereby backing the conveyor installation 10 out of the first freight car 328 and across the ramp 340 thereof into the second freight car 330 where he repeats the foregoing operation of stacking in order to fill the second freight car 330 with multiple stacks of bags in layers.

As the propelling unit 16 is backed in this manner, one of its ground wheels re-engages the curved portion 368 of the guide rail 366 and is guided by it from a position perpendicular to the loading dock 322 to a position lengthwise of the latter, this guidance being continued as the freight car 330 is filled and the conveyor installation 10 backs out of it and across the ramp 342 onto the loading dock 322. In performing the foregoing operations, it is preferable that the forward end of the stacking conveyor belt 214 be positioned sufficiently high above the level of the layer upon which the bags are to be deposited to permit the bags to "somersault" or turn end over end as they drop through the air onto the stack. The ribs 318 on the stacking conveyor belt 314 maintain a yielding frictional connection with the bags B regardless of the angle of inclination of the conveyor boom structure 322, so that the bags do not slip while they are being conveyed along the belt 214. Since the propelling wheels 74 are placed closely adjacent one another and side by side, no differential is required in connection with the shaft 72, and the double wheels thus provided impart greater traction to the propelling unit 16.

*Modified stacking conveyor with independently swingable stacking unit*

The modified self-propelled articulated stacking conveyor, generally designated 400, shown in FIGURES 7 and 8, in general divides the stacking unit 18 of FIGURES 1 to 5 inclusive into two relatively movable units, namely a forward transporting conveyor supporting and driving unit, generally designated 402, and a stacking conveyor unit, generally designated 404. The forward transporting conveyor supporting unit 402 is of generally similar construction to the rearward half of the stacking unit 18 of FIGURES 1 to 5 inclusive, and accordingly similar parts are designated by the same reference numerals. Moreover, the specific stacking mechanism of the stacking conveyor unit 404 is also of generally similar construction to the stacking mechanism shown in the forward half of the stacking unit 18, hence similar parts also bear the same reference numerals.

Secured to the mid-portion of the forward frame cross member 156 (FIGURE 8) is a bracket 406 having mounted thereon an upstanding ball-headed coupling member 408 engaging a correspondingly-shaped socket member 410 on the rearward end of an upstanding bracket 412 secured to the rearward cross member 414 of the stacking conveyor unit frame, generally designated 416. The frame 416 has longitudinal angle side members 418 interconnected by the angle cross members 414, and rearwardly-directed parallel arcuate uprights or stanchions 420 secured to and rising from the opposite side members 418 near the rearward ends thereof. The upper ends of the stanchions 420 rotatably support the stacking conveyor drive shaft 204 at the rearward end of the stacking conveying subassembly, generally designated 216.

The forward stacking conveyor unit 404 steers the rearwardly-located transporting conveyor driving and supporting unit 402 by means of a tiller 422 secured to the fork 424 of the swivelling caster unit 426 mounted at the midpoint of the forward cross member 428 of the subframe 152. The fork 424 carries a caster wheel 430. The tiller 422 extends forward from the fork 424 and passes loosely and slidably through an apertured angle member 434 which is secured to and extends between the under sides of the frame side members 418, which at their rearward ends converge toward one another.

Instead of being driven from the sprocket 210 on the shaft 36 as in the stacking conveyor unit 14 of FIGURES 1 to 5 inclusive, the sprocket chain 208 of the stacking conveyor unit 404 is driven by a sprocket 436 mounted upon the output shaft 438 of a speed reduction unit 440, the input shaft 442 of which carries a pulley 444 driven by a belt 446 from a pulley 448 on the armature shaft 450 of an electric motor 452. The speed reduction unit 440 and the electric motor 452 are mounted upon a shelf or platform 454 secured to and extending between the frame side members 418.

Also mounted upon the platform 454 is an electric motor 456, the armature shaft 458 of which carries a pulley 460 which is belted as at 462 to a pulley 464 on the input shaft 466 of a speed reduction unit 468, the output shaft 470 of which carries a sprocket 472. Meshing with the sprocket 472 is a sprocket 474 which in turn meshes with a sprocket 476 upon a drum shaft 478 rotatably supported on upstanding bearing brackets 480 also mounted upon the platform 454, like the motor 456 and speed reduction unit 468. Keyed or otherwise drivingly secured to the drum shaft 478 is a cable drum 482 to which is secured one end of a stacking conveyor hoisting cable 484 which passes around pulleys 486 and 488 rotatably mounted on axles 490 and 492 respectively rotatably supported by and between channel arms 260 and the stanchions 420 respectively. The opposite end of the hoisting cable 484 is secured as at 494 to a cross member 496 which also carries a bracket 498 supporting the axle 492 of the pulley 488. The axle 490 of the pulley 486 is similarly supported by a bracket 500 mounted in the midportion of a cross member 502 extending between the channel arms 260.

In order to provide a transition of the conveyed articles from the transporting conveyor belt 26 to the stacking conveyor belt 412 there is provided an inclined slide plate 504 of approximately semi-circular outline supported by parallel brackets 506 secured to and extending forwardly from the side plates 164. The rearward edge 508 of the slide plate 504 is disposed immediately adjacent the transporting conveyor belt 26 in closely-spaced relationship therewith so as to intercept articles reaching the rearward edge of the slide 504 from the belt 26, whereas the semi-circular forward edge 510 of the slide plate 504 curves forwardly into a position directly over the rearward portion of the upper course of the stacking conveyor belt 214.

In order to control and convey current to the motors 196, 452 and 456, a flexible multi-conductor electric cable 512 extends forwardly to junction boxes 514, 516 and 518 connected respectively to control boxes 520 and 522. From the control box 520 a cable 524 extends downwardly to the motor 196, whereas from the control box 522 a cable 526 extends forwardly to a control box 528 mounted on the stacking conveyor unit frame 416. A flexible cable 530 extends upwardly from the control box 528 to the push button station 200, whereas flexible cables 532 and 534 respectively extend from the control box 528 to the motors 452 and 456 respectively. The electrical control system including these various electrical control boxes and junction boxes is conventional and beyond the scope of the present invention, and any suitable motor control system may be used.

The operation of the modified stacking conveyor 400 is generally similar to that described in connection with the stacking conveyor 10 and differs only in the procedure at the forward end thereof shown in FIGURES 7 and 8. As before, bags of the material to be conveyed and stacked arrive at the forward transporting conveyor supporting unit 402 upon the upper course of the transporting conveyor 26 which, in passing around the spike drum 34, deposits them upon the inclined slide plate 504. The bags slide down the slide plate 504 off the forward edge 510 thereof onto the stacking conveyor belt 214 which conveys them upward or downward, as the case may be, to the forward end thereof. As the conveyor belt 214 passes around the forward drum 238, the bags of material drop onto the location where they are to be stacked, as onto the floor of the freight car or truck, in a manner similar to that shown in FIGURE 6. In the modified stacking conveyor 400, however, the operator, by grasping one of the handles 254, is enabled to shift the forward unit 404 independently of the unit 402, the former pivoting relatively to the latter at the ball and socket coupling 408, 410 therebetween. The boom structure 220 of the forward unit 404 is raised and lowered by reeling in or paying out the cable 484 on the cable drum 482 by operating the motor 456 either forwardly or reversely, thereby swinging the arms 260 upward or downward around their pivots 264 and consequently raising or lowering the forward end of the boom structure 220 around the shaft 204 at its rearward end as a pivot.

The forward or rearward travel of the modified stacking conveyor 400 is also carried out in the manner described above in connection with FIGURES 1 to 6 inclusive, except that the unit 402 is steered by the manually-steered unit 404 by means of the tiller 422 being swung sidewise by its engagement with the hole in the angle member 434, thereby pivoting the caster wheel yoke 424 and caster wheel 430 around its vertical axis.

The modified stacking conveyor 400 is controlled from the switch button station 200 in a manner similar to that of the stacking conveyor 10 of FIGURES 1 to 6 inclusive, so that a single operator can move the entire conveyor backward or forward as well as raising or lowering the stacking conveyor boom structure 220 to swing the forward end of the conveyor belt 214 upward or downward.

Due to the fact that the slide plate 504 has an approximately semi-circular forward edge 510, the bags of conveyed material fall off of it onto the stacking conveyor belt 214, regardless of the horizontal angle to which the forward unit 404 is swung laterally relatively to the unit 402 immediately behind it.

What I claim is:

1. An articulated self-propelled laterally-yieldable conveyor comprising forward and rearward terminal cars spaced apart from one another and an intermediate car disposed in the space therebetween and having articulation connections therewith; each car having a frame with an endless conveyor supporting wheel rotatably mounted on the upper portion thereof and ground wheels rotatably mounted on the lower portion thereof, and a laterally-yieldable endless transporting conveyor belt mounted on said supporting wheels in supported relationship therewith; one of said terminal car frames having a car-propelling motor thereon drivingly connected to its respective ground wheels, one of said terminal car frames having a conveyor driving motor thereon drivingly connected to its respective conveyor supporting wheel, means on the forward terminal car for controlling the operation of said motors, a stacking conveyor movably mounted on said forward car with its rearward end disposed adjacent the forward end of said transporting conveyor belt, said forward car having separate relatively-swingable leading and trailing car units pivotally articulated to one another, said conveyor supporting wheel of said transporting conveyor being mounted on said trailing car unit and said stacking conveyor being mounted on said leading car unit, and a motor drivingly connected to said stacking conveyor; said trailing car unit having a ground wheel mount pivotally mounted thereon with a vertical pivot axis, a ground wheel rotatably mounted in said mount, a steering member secured to and extending forwardly from said mount to said leading car unit, and steering member guide means on said leading car unit longitudinally slidably receiving the forward portion of said steering member while restraining the same from lateral swinging movement relatively to said leading car unit.

2. An articulated self-propelled laterally-yieldable conveyor comprising forward and rearward terminal cars spaced apart from one another and an intermediate car disposed in the space therebetween and having articulation connections therewith; each car having a frame with an endless conveyor supporting wheel rotatably mounted on the upper portion thereof and ground wheels rotatably mounted on the lower portion thereof, and a laterally-yieldable endless transporting conveyor belt mounted on said supporting wheels in supported relationship therewith; one of said terminal car frames having a car-propelling motor thereon drivingly connected to its respective ground wheels, one of said terminal car frames having a conveyor driving motor thereon drivingly connected to its respective conveyor supporting wheel, means on the forward terminal car for controlling the operation of said motors, a stacking conveyor movably mounted on said forward car with its rearward end disposed adjacent the forward end of said transporting conveyor belt, said forward car having separate relatively-swingable leading and trailing car units pivotally articulated to one another, said conveyor supporting wheel of said transporting conveyor being mounted on said trailing unit and said stacking conveyor being mounted on said leading unit, and a motor drivingly connected to said stacking conveyor.

3. An articulated self-propelled laterally-yieldable conveyor comprising forward and rearward terminal cars spaced apart from one another and an intermediate car disposed in the space therebetween and having articulation connections therewith; each car having a frame with an endless conveyor supporting wheel rotatably mounted on the upper portion thereof and ground wheels rotatably mounted on the lower portion thereof, and a laterally-yieldable endless transporting conveyor belt mounted on said supporting wheels in supported relationship therewith; one of said terminal car frames having a car-propelling motor thereon drivingly connected to its respective ground wheels, one of said terminal car frames having a conveyor driving motor thereon drivingly connected to its respective conveyor supporting wheel, means on the forward terminal car for controlling the operation of said motors, a stacking conveyor movably mounted on said forward car with its rearward end disposed adjacent the forward end of said transporting conveyor belt, said forward car having separate relatively-swingable leading and trailing car units pivotally articulated to one another, said conveyor supporting wheel of said transporting conveyor being mounted on said trailing unit and said stacking conveyor being mounted on said leading unit, and a motor drivingly connected to said stacking conveyor for effecting upward and downward swinging motion of said stacking conveyor relatively to said leading unit.

4. An articulated self-propelled laterally-yieldable conveyor comprising forward and rearward terminal cars spaced apart from one another and an intermediate car disposed in the space therebetween and having articulation connections therewith; each car having a frame with an endless conveyor supporting wheel rotatably mounted on the upper portion thereof and ground wheels rotatably mounted on the lower portion thereof, and a laterally-yieldable endless transporting conveyor belt mounted on said supporting wheels in supported relationship therewith; one of said terminal car frames having a car-propelling motor thereon drivingly connected to its respective ground wheels, one of said terminal car frames having a conveyor driving motor thereon drivingly connected to its respective conveyor supporting wheel, means on the forward terminal car for controlling the operation of said motors, a stacking conveyor movably mounted on said forward car with its rearward end disposed adjacent the forward end of said transporting conveyor belt, said forward car having separate relatively-swingable leading and trailing car units pivotally articulated to one another, said conveyor supporting wheel of said transporting conveyor being mounted on said trailing unit and said stacking conveyor being mounted on said leading unit, a motor drivingly connected to said stacking conveyor, and a transfer member having its rearward end secured to said trailing unit adjacent said transporting conveyor and extending forwardly over the rearward portion of said stacking conveyor with the rearward end of said stacking conveyor laterally freely movable relatively to said transfer member for horizontal swinging movement of said stacking conveyor independently of said transfer member and transporting conveyor.

5. An articulated self-propelled laterally-yieldable conveyor comprising forward and rearward terminal cars spaced apart from one another and an intermediate car disposed in the space therebetween and having articulation connections therewith; each car having a frame with an endless conveyor supporting wheel rotatably mounted on the upper portion thereof and ground wheels rotatably mounted on the lower portion thereof, and a laterally-yieldable endless transporting conveyor belt mounted on said supporting wheels in supported relationship therewith; one of said terminal car frames having a car-propelling motor thereon drivingly connected to its respective ground wheels, one of said terminal car frames having a conveyor driving motor thereon drivingly connected to its respective conveyor supporting wheel, means on the forward terminal car for controlling the operation of said motors, a stacking conveyor movably mounted on said forward car with its rearward end disposed adjacent the forward end of said transporting conveyor belt, said forward car having separate relatively-swingable leading and trailing car units pivotally articulated to one another, said conveyor supporting wheel of said transporting conveyor being mounted on said trailing unit and said stacking conveyor being mounted on said leading unit, a motor drivingly connected to said stacking conveyor, a transfer member having its rearward end secured to said trailing unit adjacent said transporting conveyor and extending forwardly over the rearward portion of said stacking conveyor with the rearward end of said stacking conveyor laterally freely movable relatively to said transfer member for horizontal swinging movement of said stacking conveyor independently of said transfer member and transporting conveyor, said transfer member having an arcuate forward edge overhanging said stacking conveyor.

References Cited in the file of this patent

UNITED STATES PATENTS

| | | |
|---|---|---|
| 799,139 | Spence | Jan. 3, 1905 |
| 2,250,933 | Manierre | July 29, 1941 |
| 2,459,358 | Birkhead | Jan. 18, 1949 |
| 2,596,265 | Manierre | May 13, 1952 |
| 2,793,731 | Manierre | May 28, 1957 |